Figure 4:
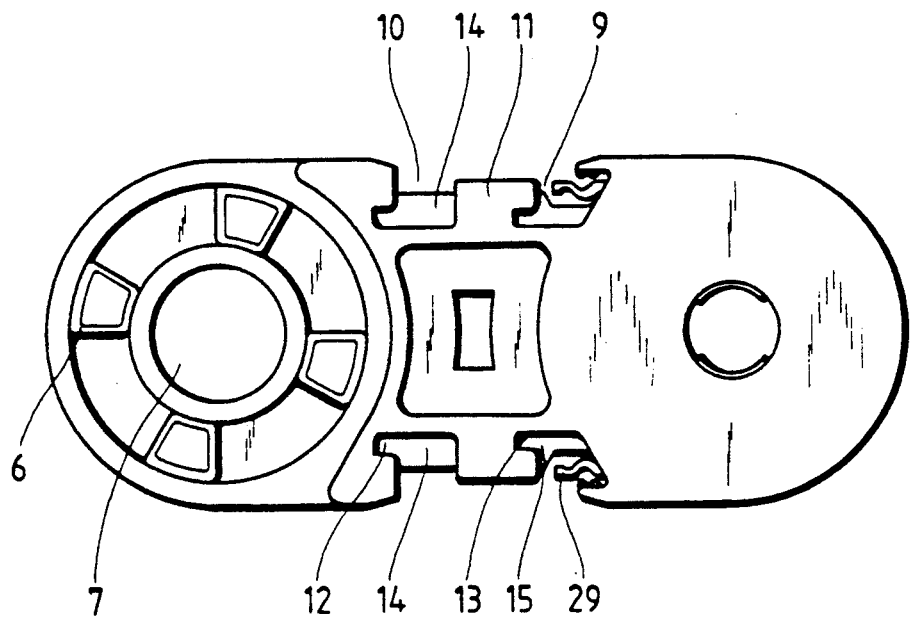

United States Patent [19]
Klein et al.

[11] Patent Number: 5,184,454
[45] Date of Patent: Feb. 9, 1993

[54] CABLE CARRIER CHAIN

[75] Inventors: Ernst Klein, Düsseldorf; Hartmut Loss, Wuppertal, both of Fed. Rep. of Germany

[73] Assignee: A&A Manufacturing Co., Inc., New Berlin, Wis.

[21] Appl. No.: 879,050

[22] Filed: May 6, 1992

[30] Foreign Application Priority Data

Jun. 28, 1991 [DE] Fed. Rep. of Germany ....... 4121433

[51] Int. Cl.$^5$ ............................................. F16G 13/16
[52] U.S. Cl. ...................................... 59/78.1; 59/900; 248/49
[58] Field of Search .................. 59/78.1, 900; 248/49, 248/51, 52

[56] References Cited

U.S. PATENT DOCUMENTS

| | | | |
|---|---|---|---|
| 4,590,961 | 5/1986 | Schumann | 69/78.1 |
| 4,800,714 | 1/1989 | Mortiz | 59/78.1 |
| 4,807,432 | 2/1989 | Mauri | 59/78.1 |
| 4,833,876 | 5/1989 | Kitao et al. | 59/78.1 |
| 5,108,350 | 4/1992 | Szpakowski | 59/78.1 |

FOREIGN PATENT DOCUMENTS

| | | |
|---|---|---|
| 0308958 | 9/1989 | European Pat. Off. . |
| G8524845.2 | 11/1985 | Fed. Rep. of Germany . |
| 3516448 | 9/1986 | Fed. Rep. of Germany . |
| 3617447 | 10/1987 | Fed. Rep. of Germany . |
| 3522885 | 6/1988 | Fed. Rep. of Germany . |
| 8513491 | 8/1985 | United Kingdom ................ 59/78.1 |

Primary Examiner—David Jones
Attorney, Agent, or Firm—Quarles & Brady

[57] ABSTRACT

A cable carrier chain made of pivotally connected pairs of spaced apart, parallel sidebars has crosslinks spanning the pairs of sidebars which are engaged in notches in the edges of the sidebars. The crosslinks are placed in the notches and are longitudinally slid to an engaged position where flanges of the crosslinks are received in undercuts in the notches to secure the crosslinks to the sidebars against vertical relative movement. In the engaged position, bars, bosses or tenons of the sidebars which have laterally facing surfaces are engaged by slots in the crosslinks to prevent lateral movement of the crosslinks relative to the sidebars. A key or a tab is provided to secure the longitudinal position of the crosslinks relative to the corresponding sidebars to prevent retrograde movement of the crosslinks from the engaged position.

19 Claims, 6 Drawing Sheets

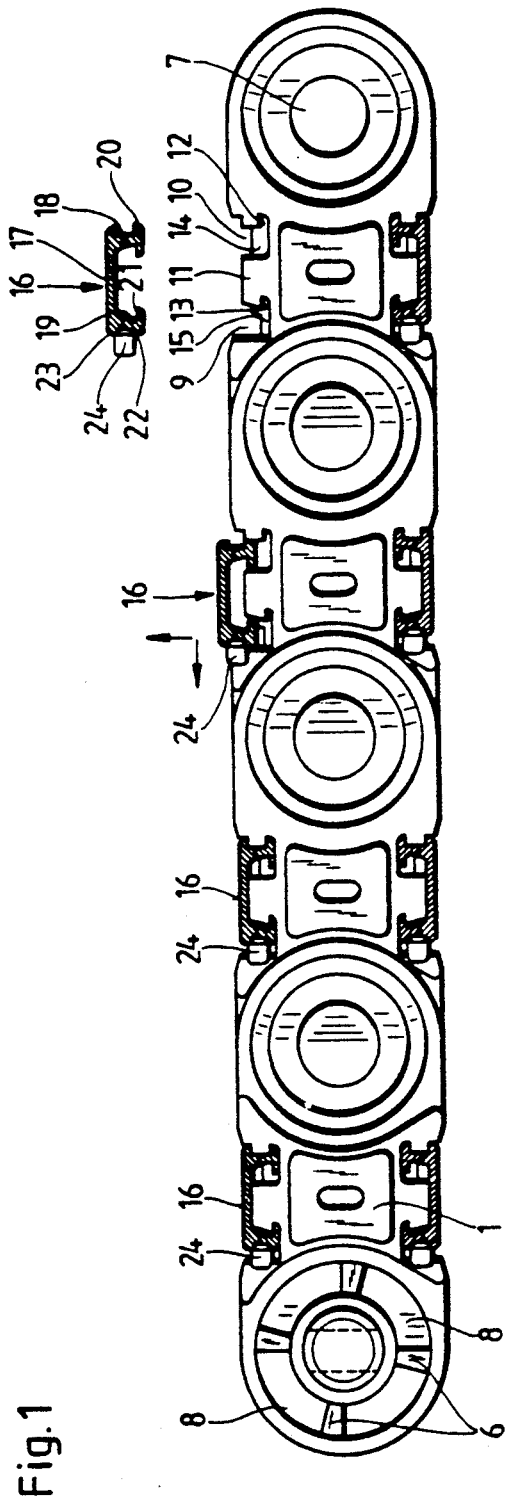
Fig. 1
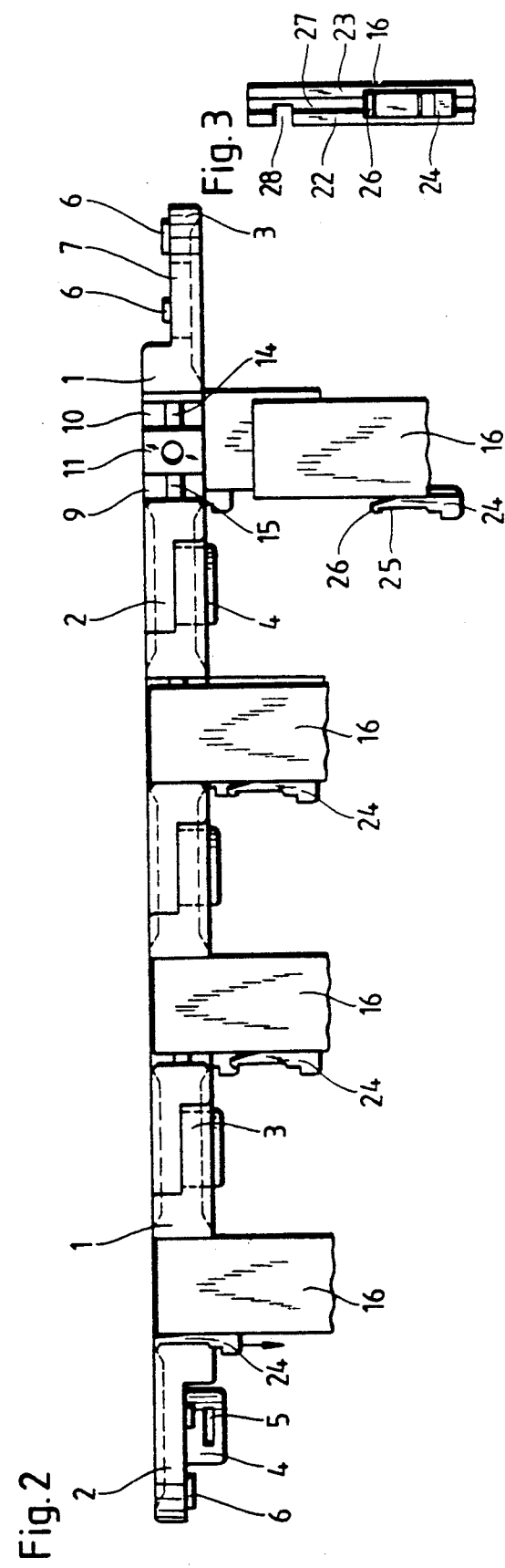
Fig. 2
Fig. 3

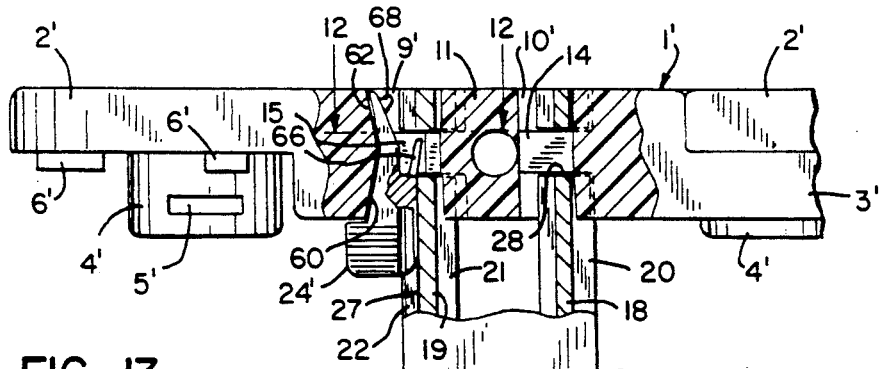
FIG. 11
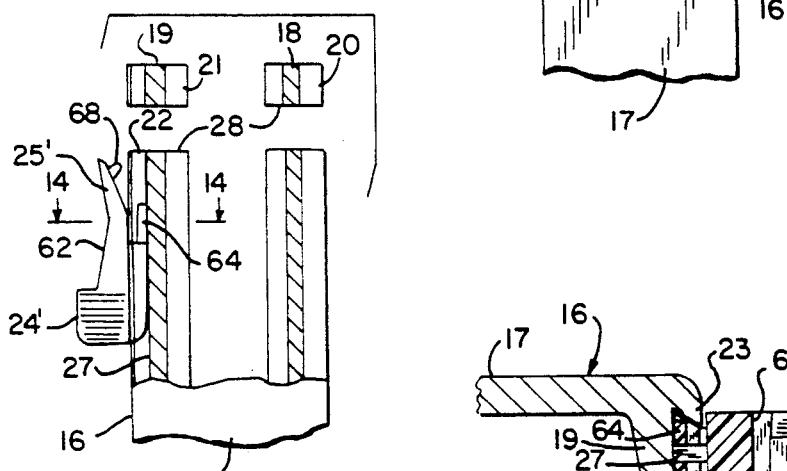
FIG. 13
FIG. 14
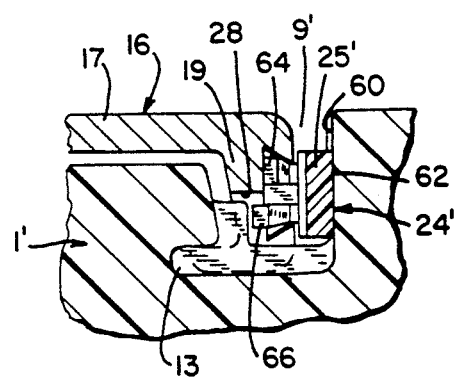
FIG. 12

5,184,454

CABLE CARRIER CHAIN

FIELD OF THE INVENTION

The invention pertains to a cable carrier chain designed to support hoses, cables and the like and particularly one made of identical, parallel sidebars joined by crosslinks and designed so as to allow pivoting between adjacent sidebars in one direction only.

BACKGROUND OF THE INVENTION

Cable carriers of this type are described in German Patent 35 16 448, in utility model specification G 85 24 845 and in European patent application 0 308 958. Common to these known cable carriers is that the top and bottom edges of the sidebars are provided with mounts into which the ends of the crosslinks can be inserted so as to make a connection with the sidebars which gives both frictional and form fit. The specific shape of the attachment between the sidebars and the crosslinks is intended to facilitate the assembly of the links in this cable carrier without need of bolts, pins, nuts or the like and it is to be possible to separate the connections again without tools or in any case with only a simple tool such as a screwdriver. To achieve this, the ends of the crosslinks for the cable carrier chain as described in German Patent 35 16 488 terminate in insertion parts which are T-shaped in cross section, featuring at the outside faces of the crosslinks grooves, the one side of such grooves being formed by the detent springs running parallel to the direction in which the crosslinks are inserted. The sidebars are mirror images one of the other, i.e. the designs for the right and left sidebars differ. The crosslinks are inserted into the mounts from above and locked in place. In the cable carrier described in utility model specification G 85 24 845 the crosslinks exhibit a C-shaped cross section at the ends and are also positioned from above on the catches protruding from the 0 sidebars and locked in place. In this cable carrier, too, the sidebars are mirror images one of the other, i.e. different parts are used for the left and right sidebars.

The sidebars of the cable carrier chain described in European publication of unexamined patent 0 308 958 are identical whereby those on the right-hand side are rotated through 180° in relation to those on the left-hand side. The sidebars are also joined by crosslinks which are C-shaped in cross section, which are positioned from above on the catches protruding from the sidebars and which are locked in place.

Although in the three known cable carrier chains the connection between the sidebars and the crosslinks can essentially be characterized as being form-fitting, the locking in all cases is based on the compression or extension of catch tabs with retaining ledges which under severe loading can deviate from the normal position so that the attachment between the sidebars and the crosslinks can be unintentionally separated. The danger is all the greater since in all three known cable carriers the release direction for the crosslinks is identical with the direction in which the greatest forces which may be encountered are exerted. These forces can arise inside the box-like profile formed by the sidebars and the crosslinks due to buckling and bunching of the hoses or cables laid inside the cable carrier chain.

Further of disadvantage in these known cable carriers is that the ends of the crosslinks are injection moulded parts with complex geometry so that a different crosslink must be manufactured for each carrier width, using different injection moulding dies in each case. An exception is represented only by the design of the crosslinks in European patent application 0 308 958 in which a crosslink comprising two halves is used whereby the one half is made up of one of the mating ends and a very long center section shot-moulded onto that end and the other half is made up of the other mating end and a section designed to receive the center section. Cutting the center section of the one half to length and then inserting it in the mount in the other half makes it possible to fabricate assembled chain links of any desired width with the assistance of such crosslinks so that costly, differing moulds and sizes need not be kept on hand for the various cable carrier widths; differing injection moulding dies are nonetheless required for each half.

SUMMARY OF THE INVENTION

It is a general object of the present invention to create a cable carrier chain in which the sidebars and the crosslinks are joined one with another in a form-fitting fashion, which cannot be released by applying force which would cause the catch connectors to disengage and which can nonetheless easily be assembled and separated without requiring special tools for this purpose or in any case only a screwdriver.

A further object is to provide a cable carrier chain of the type mentioned at the outset, that by way of the invention notches are located along opposing edges of the sidebars to accept the ends of the crosslink, that such notches incorporate undercuts and bars, bosses and/or tenons located at a distance from the edges of the sidebars and inside the notches, that the ends of the crosslinks be shaped in a complementary fashion for insertion into the notches and allowing shifting until a positive connection is made with the undercuts and bars, bosses and/or tenons, and that releasable locking means be provided to prevent separation of the positive fit.

The invention is based on the consideration that initially a positive fit must be achieved between the sidebars and the crosslinks by inserting and shifting the ends of the crosslink whereby in this phase the positive fit itself is already resistant to release along the vector of the forces which impinge on the cable carrier and that the separation of the positive fit can be prevented by locking devices which preclude movement along the axis along which the crosslink was shifted and which are essentially not subject to deformation along this vector. These locking devices can be released only by sliding or rotating them in a direction perpendicular to the axis along which the crosslinks are shifted and prevent by positive fit any shifting of the crosslinks in relationship to the sidebars, it not being possible to overcome this positive fit by the relatively low forces which act opposite the direction in which the crosslinks shift.

The innovative connection between the sidebars and the crosslinks is based exclusively on an exact and positive fit between the parts to be joined, this fit not being secured by spring tabs with catch detents, so that this positive fit cannot be separated as a result of relaxation of the spring-loaded tabs which is the case in the state of the art.

Since the locking devices are released by moving them perpendicular to the direction of crosslink shift during engagement and since no forces of any consequence are generated along this axis during the use of the cable carrier, the locking devices need exert only low catch forces, making them easy to release to remove the crosslinks.

The crosslinks being made of extruded sections can easily be cut to the desired length. To shape the ends of the crosslinks so as to be complementary to the notches in the sidebars it is sufficient to utilize simple machining processes to form grooves or slots and this can be done simultaneous to cutting the crosslinks to length. The extrusions may be made of plastic or metal.

To achieve positive fit between the sidebars and the crosslinks the ends of the crosslinks may exhibit at least one vertical web and at least one perpendicular flange whereas there will be undercuts at least on one side at the bottom of the notches and of a depth corresponding to the flange dimensions. To allow for shifting the crosslinks after insertion in the notches in order to achieve positive fit with the sidebars, the notches in the sidebars may be at least as wide as one vertical web and one perpendicular flange section at one side.

Furthermore undercuts of a depth corresponding to the perpendicular flange dimensions may be provided at both sides at the bottom of the notches.

The ends of the crosslinks can be formed so as to represent an L-profile, a T-profile, an I-profile or a C-profile in cross section.

In those versions in which the ends of the crosslinks take the form of an L-profile, a T-profile or an I-profile it is advantageous for the notches in the sidebars to be about as wide as the flanges and that there be located on one side at the bottom of the notches undercuts of dimensions corresponding to those of the flanges and on the opposite side of the notches undercuts corresponding to the height of the webs.

In the end section of the C-shaped crosslink there may be located flanges which extend in the same direction from the arms, one notch each in the sidebars for the two arms with the flanges and on the one side at the bottom of each notch an undercut with dimensions matching those of the mating flanges.

To achieve positive-fit transverse fastening of the crosslinks at the sidebars there may be located in at least one of the undercuts and/or on the upper face of the land located between the two notches either bosses or pins and mating grooves and/or slots. During the insertion and shifting of the crosslinks in the sidebars these bosses, pins, grooves and/or slots engage one with another in a form-fitting manner and prevent the crosslinks being pulled out of the sidebars.

The fastening devices designed so as to allow disengaging may comprise a key which can be slid into the notches and which exhibits a width corresponding to the width of the open space in the notches. These keys may be slideable in guides on the crosslinks and may be kept captive by shaping them appropriately to prevent loss. A further version of the locking devices designed to allow disengaging may comprise rotating eccentric cams which are attached permanently and adjacently to the notches.

In a further version of the fastening devices designed to allow disengaging, elastic catch tabs oriented along the longitudinal direction of the sidebars may be located in at least one of the notches. A favorable version of the invention may be found in that the crosslinks at least in the end sections exhibit a vertical web and a perpendicular flange extending to both sides and that the notches in the sidebars are generally as wide as a vertical web and a perpendicular flange section and that on both sides of the notches undercuts are provided of a depth corresponding to the flange dimensions and that in each case approximately at the center of one of the two opposing undercuts there is a tenon and mating with it at least in the corresponding perpendicular flange section there is a notch, and the releasable locking device consists of keys which can be slid into the notches.

The undercut featuring the center tenon may preferably be about as high as the corresponding flange section while the height of the opposite undercut may be approximately the same height as the web and the cross section of the key corresponds to the section of the open space in the notch when the perpendicular flange with the notch is engaged with the undercut and the tenon.

In this version at least the ends of the crosslink comprise an inverted T-profile. This profile can be inserted from the side and into the notch in the sidebar and then shifted along the longitudinal axis of the sidebar until the flange engages with the undercut, thus causing the notch in the flange to straddle the tenon in the undercut. In this position the crosslink is largely secured by positive fit to resist displacement. Shifting back out of the engaged position is prevented by a key which can be slid along the longitudinal axis of the crosslink, which fills the entire free space left in the notch and which effects the final positive fit connection. A plurality of such T-shaped crosslinks can be arranged parallel one to another and attached to a single sidebar.

A further, similar version of the invention can be found in crosslinks in which at least the end sections consist of an I-profile with upper and lower flanges and the web which joins them, the notches in the sidebars are approximately as wide as the flanges, on one side at the bottom of the notches there are undercuts of dimensions corresponding to the flanges and in which tenons are provided at the center, on the opposite of the notches there are undercuts corresponding to the height of the webs, the flanges exhibit notches matching the center tenons and the releasable locking devices comprise keys which can be slid into the notches and which exhibit a cross section corresponding to the cross section remaining free in the notch after the insertion of the crosslink.

In this version the crosslinks can be inserted into the notches in the sidebars either from the side or from above and are then shifted along the longitudinal axis of the sidebars to cause the flanges to engage with the undercuts. Final form-fitting locking is then once again achieved with the key which can slide at right angles to the shifting direction and which is preferably retained by dovetail guides formed by the surfaces of perpendicular flanges facing the key.

A further preferred version of the invention can be characterized by the fact that the crosslinks at least at the ends exhibit a C-shape and have flanges projecting in the same direction from the perpendicular webs and that there is one notch each in the sidebars for the two vertical webs with their flanges, between which notches is a land entering the C-shaped cross section, that at one side at the bottom of each notch there is an undercut of dimensions corresponding to the matching flange, that the width of the notches is at least equal to the width of the flanges with the vertical webs and that transverse fastening elements are located in the area at the notches and/or the land located between them.

In this version the ends of the crosslinks are inserted from above into the notches in the sidebars until engagement has been made with the transverse securing elements. Then the ends of the crosslinks are shifted along the longitudinal axis of the sidebars until the flanges engage with the undercuts. The interaction of the flanges with the undercuts and the tenons with the grooves and/or the pins or bosses with the slots again gives a positive fit connection which will withstand all the forces encountered during operation.

The releasable locking devices which are to prevent the crosslinks being shifted back out of the engaged position and thus separating the positive fit connection can comprise elastic detent tabs located in at least one of the notches and pointing in the longitudinal direction of the sidebars. These detent tabs are however not elastic in the longitudinal direction but rather in the transverse direction so that following the insertion of the crosslinks and return of the detent tabs to their relaxed position there is a pure positive fit connection which would lead to destruction of the detent tabs if an attempt were made to separate the form-fitting connection between the crosslinks and the sidebars just by shifting back the crosslinks. Since the forces applied in this direction are not the largest forces encountered during operations, there is sufficient protection against disengagement. The form-fitting connection can be released in simple fashion by using a screwdriver to depress the elastic detent tabs at right angles to the shifting direction so that the crosslink can be shifted back and the form-fitting connection with the sidebar is separated.

As in the versions with the T-shaped and I-shaped profiles here again the releasable locking devices comprise keys or rotating eccentric cams in at least one of the two notches.

In this version a dovetail guide can be formed to retain the congruently shaped key by positioning a flange on one side of the upper web area which interacts with a matching lower flange perpendicular to the vertical web of the C-shaped section.

Flanges can be located on both sides of and perpendicular to the free ends of the vertical webs whereby the flexural strength of the crosslinks is increased.

Figure 5:
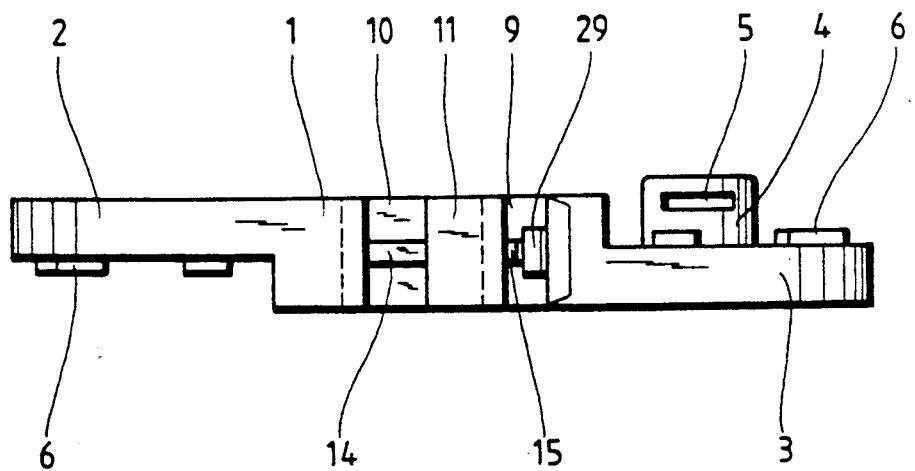
Figure 6:
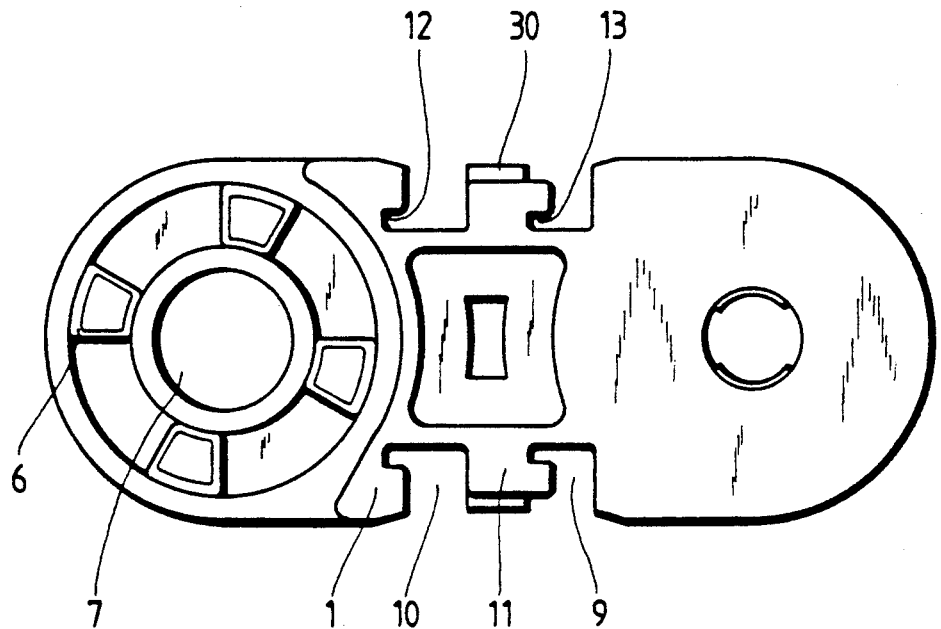
Figure 7:
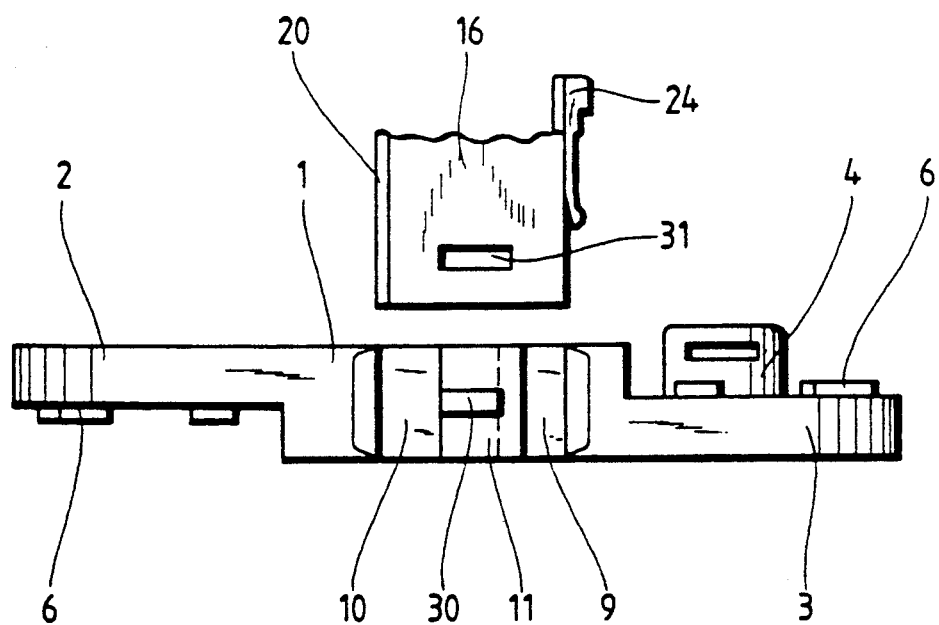
Figure 8:
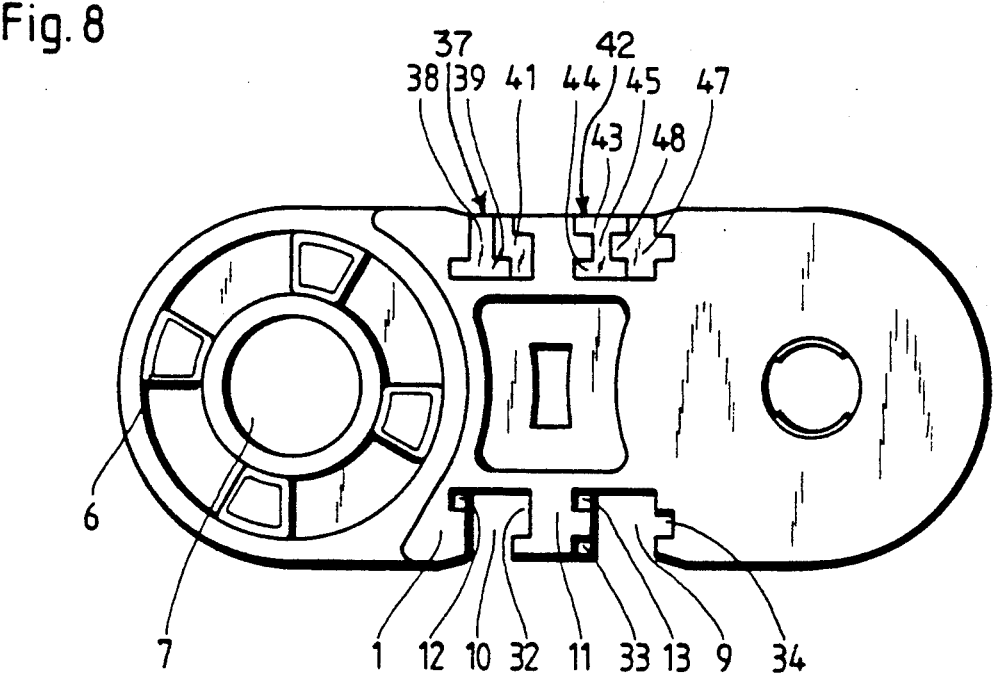
Figure 9:
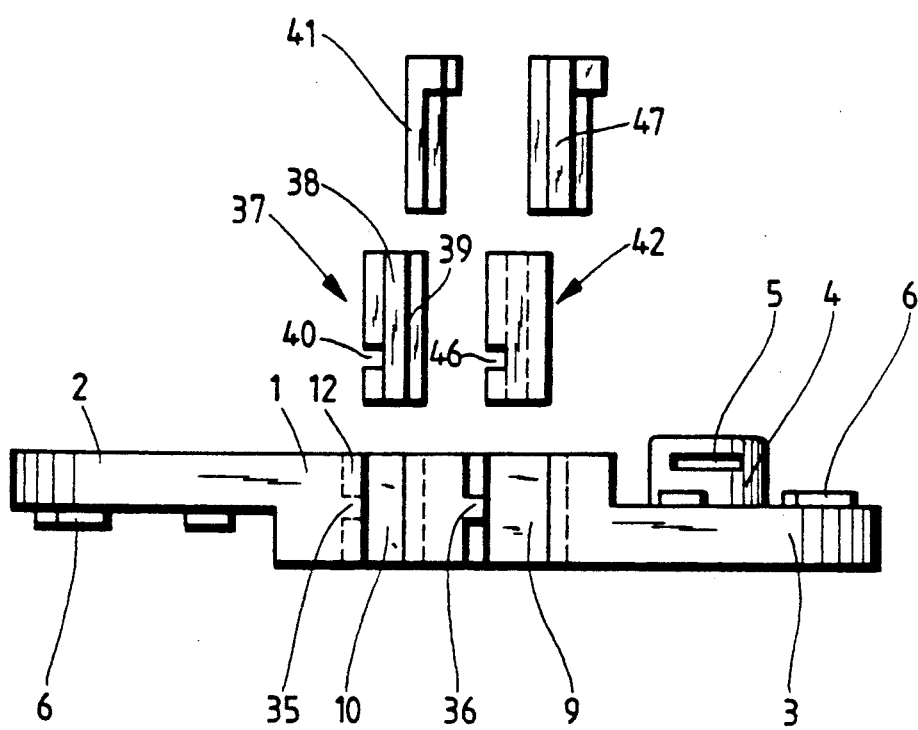
Figure 10:
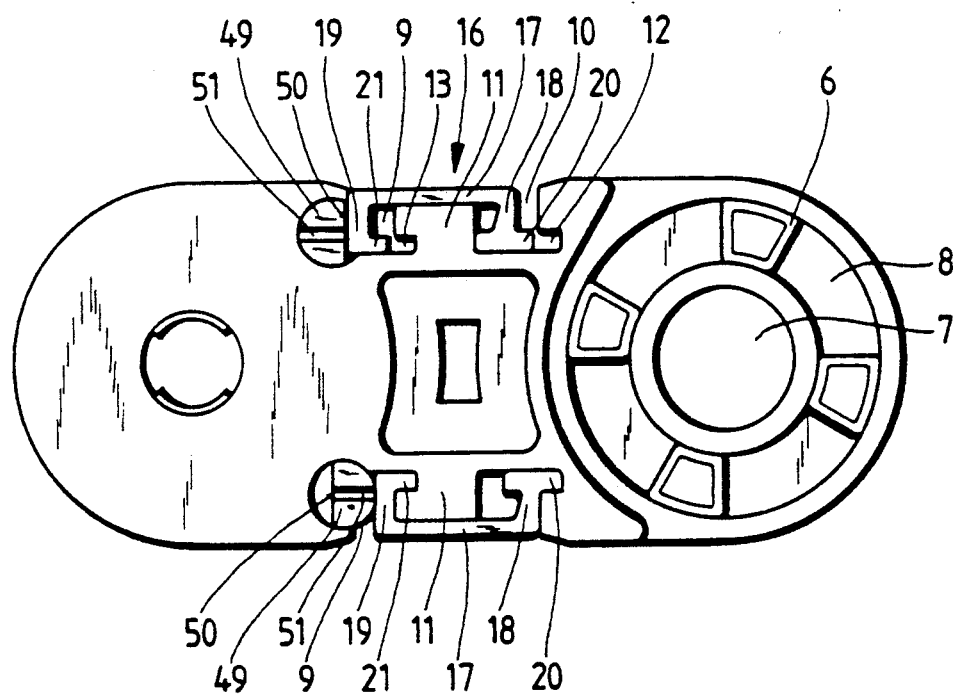

The invention is explained below in detail using several execution examples depicted in the drawing. Shown in the drawing are:

FIG. 1, a side elevational view of four links in a cable carrier chain, with a depiction of the crosslink installation procedure;

FIG. 2, a top view of the cable carrier chain shown in FIG. 1;

FIG. 3, a side elevational view of a crosslink;

FIG. 4, a side elevational view of a sidebar with releasable locking devices in the form of elastic detent tabs;

FIG. 5, a top view of the sidebar as per FIG. 4;

FIG. 6, a side elevational view of a sidebar with modified transverse locking elements;

FIG. 7, a top view of the sidebar as per FIG. 6;

FIG. 8, a side elevational view of a sidebar depicting a T-shaped and an I-shaped crosslink;

FIG. 9, a top view of a sidebar as per FIG. 8;

FIG. 10, a side elevational view of a sidebar with releasable locking devices in the form of rotating eccentric cams;

FIG. 11, a top view with portions broken away of a modified form of the side bar and key shown in FIG. 1-3 shown with the crosslink;

FIG. 12, an enlarged cross-sectional view taken along the plane of the line 12—12 of FIG. 11;

FIG. 13, a top view with portions broken away of the crosslink and key of FIGS. 11 and 12 with the key shown in a retracted position; and FIG. 14, an enlarged cross-sectional view as viewed from the plane of the line 14—14 of FIG. 13.

The cable carrier chain supporting hoses, cables or the like comprises two parallel strings of interlinked sidebars 1 due to the design of which the chain is self-supporting so as to be able to span a larger distance while being able to bend at a certain radius and continue in a different section.

The sidebars 1 can be of a known style and exhibit two longitudinal sections 2, 3 offset one against the other in reference to the center plane of the sidebar and exhibit a pivot pin 4 projecting from the one section 2 while the other section 3 exhibits a matching hole 7. The pivot pin 4 of one sidebar 1 engages in a known fashion with the hole 7 of the adjacent sidebar 1 and is retained there in the axial direction by a cotter pin type fastener not depicted which is inserted on the outside of the sidebar and into a groove 5 in the pivot pin 4. Pins 6 project to the side from the central longitudinal plane of the sidebars 1 and engage with complementary recesses 8 of the mating longitudinal sections 2, 3. These pins 6 in conjunction with the recesses 8 insure that the cable carrier can be bent in one direction only while at the same time they form limiter stops for the other direction, with the result that the cable carrier is self-supporting when stretched out in a straight line.

Parallel notches 9, 10, separated one from the other by a land 11, are located in opposite edges of the sidebars 1. Each notch 9, 10 is provided with undercuts 12, 13 extending in the same direction and longitudinal to the sidebar 1. Located moreover in the notches 9, 10 are bar-like struts 14, 15 aligned with the longitudinal center plane of the sidebar 1. A C-shaped crosslink 16 comprises an upper spine 17 and along its side parallel arms 18, 19 and located on these arms 18, 19 perpendicular flanges 20, 21, 22 extending to both sides. A further flange section 23 projects at the level of the upper spine 17 and forms together with the flange 22 a dovetail guide 27 for a key 24 shaped appropriately and which can thus be slid inside the dovetail guide 27 only along the longitudinal axis of the crosslink 16. The key 24 exhibits an elastically resilient end 25 with a detent lug 26.

A groove 28 is machined into the vertical arms 18, 19 and the flanges 20, 21 22, the width and height of which groove correspond to the bars 14, 15. Together with the bars, this groove 28 forms a feature to prevent transverse sliding. The key 24 may also have a detent lug as described more fully with respect to FIGS. 11-14 which easily engages in the groove 28 preventing the key 24 from slipping out of the dovetail guide 27 when the crosslink 16 is not yet engaged with the sidebar 1.

The bar 14 extends along the entire length of the notch 10 whereby the bar 15 is reduced in height or interrupted entirely to allow insertion of the key or clamping wedge 24 in the notch 9.

To join a crosslink 16 in a form-fitting manner with a sidebar 1 the former is positioned from above and over the notches 9, 10 in such a way that the groove 28 straddles the bars 14, 15. Since the width of the notches 9, 10 corresponds generally to the width of the flanges 20, 21, 22 the end of the crosslink 16 can be inserted without difficulty in the notches 9, 10.

Thereafter the crosslink 16 will be slid to the right as shown in FIGS. 1 and 2 so that the flanges 19, 20 enter the undercuts 13, 12. The dimensions of the flanges 19, 20 and the undercuts correspond one with another so that they engage essentially without play. When in this position the positive fit which resists the essential forces encountered has already been effected. In order to keep the crosslink 16 from shifting back and out of position the key 24 is now slid perpendicular to the shifting direction and into the open intermediate space between the crosslink 16 and the notch 9. This key 24 thus creates a positive fit in this direction, too, so that the connection between the crosslink 16 and the sidebar 1 cannot be subsequently separated by the forces impinging on the cable carrier chain. This also applies where the connection between the crosslink 16 and the sidebar 1 has been separated and reestablished multiple times since no wear is encountered in the area of the undercuts 12, 13 and of the flanges 20, 21 which engage with them and also since the key 24 is of a solid design, nonelastic in the loading direction. The elastically sprung ends 25 with the detent lug 26 serve only to keep the clamping wedge 24 in place after it has been slid into position in the transverse direction.

The procedure used to release the connection is the reverse of the one just described.

It is apparent that with the innovative attachment concept a purely form-fitting connection is made which will withstand all normal loading and which nonetheless can be designed for easy release since the crosslinks and the sidebars are amenable to manufacture at close tolerances so that the connection between these components can be laid out for essential freedom from play but nonetheless for easy movement.

The keys 24 can also be designed to slide easily so that they can be released without difficulty and in any case with the assistance of just a screwdriver.

The versions as per FIGS. 4 and 5 differ from those shown in FIGS. 1 to 3 in that the releasable locking devices comprise not transversely slideable keys but rather transversely elastic detent tabs 29 facing in the longitudinal direction. The crosslinks 16 to be joined with the sidebars 1 are not modified and are not depicted separately. When inserting the end of a crosslink in the notches 9, 10 the detent tab 29 is initially pressed downwards but then snaps back as soon as the crosslink is shifted so that the flanges 20, 21 engage in the undercuts 12, 13. Now the detent tabs 29 are in contact with the vertical arm 19 and prevent shifting back.

To release the connection between the crosslink 16 and the sidebar 1 a screwdriver is used to depress the detent tab 29 until it reaches the area at the groove 28. Then the crosslink 16, as previously described, can be shifted back and lifted out of the notches 9, 10.

Whereas in the versions as per FIGS. 1 to 5 transverse sliding retainers are present in the form of the bars 14, 15 which engage in the groove 28 of the crosslink 16, these bars 14, 15 can be replaced as per FIGS. 6 and 7 by bosses 30 on the land 11. The crosslink 16 in this case exhibits a mating slot 31 which is longer than the boss 30. In this way the crosslink 16 can be shifted as already described in such a way that its flanges 20, 21 engage with the undercuts 12, 13. Locking is once again effected with the key 24.

FIGS. 8 and 9 illustrate two further versions. The notch 10 is designed in such a way as to accept a T-shaped crosslink 37. To this end the notch 10 features the undercut 12 and a further undercut 32 located opposite. The undercut 12 is interrupted in the center by a tenon 35. The distance between the edge of the tenon 35 and the opposite inside surface of the undercut 32 corresponds generally to the width of a perpendicular flange 39 extending to both sides of the web and which together with the vertical web 38 forms the T-shaped crosslink 37. The upper width of the notch 10 need only to correspond to the width of the vertical web 38 and the flange section projecting to one side so that the crosslink 37 can be inserted laterally into the notch 10. Then the crosslink 37 is shifted in the longitudinal direction of the sidebar 1 as previously described until the flange 39 engages with the undercut 12. The tenon 35 hereby comes into engagement with the notch 40, keeping the crosslink 37 from falling out to the side. Shifting the crosslink 37 back is prevented by a key 41 which is shaped to correspond with the cross section of the open space left in the notch 10 when the crosslink 37 is inserted in this intermediate space and has been shifted to engage with the undercut 12. This profile design for the key 41 in conjunction with the undercut 32 prevents not only shifting back but also any rotation or tipping of the crosslink 37. The dimensions in the height and width of undercut 12 correspond generally to those of the flange 39 while those of the undercut 32 correspond generally with those of the vertical web 38.

The end of the crosslink can also be L-shaped with a flange extending to one side only. In this case no further undercut is needed opposite undercut 12. The key can be a simple rectangular profile of a width corresponding to that of the notch 10 after the insertion of the L-shaped profile.

An I-shaped crosslink 42 can also be joined with the sidebar 1. This crosslink 42 comprises an upper flange 43, a lower flange 44 and a web 45 joining the two flanges 43, 44. Located in the area at the land 11 are the undercut 13 and a shoulder 33, each of which exhibits a tenon 36 at the center. Corresponding notches 46 are located in the upper and lower flanges 43, 44 of the crosslink 42. The notches 9 are generally as wide as the flanges 43, 44 while the dimension of the undercut 13 and the shoulder 33 correspond generally to those of the flanges 43, 44 and the dimensions of the undercut 34 correspond generally to the intermediate space between the flanges 43, 44. In this version the I-shaped crosslink 42 can be inserted either from above or laterally into the notch 9 and shifted until its flanges 43, 44 engage with the undercut 13 and the shoulder 33. Now a key 47 of a cross-shaped section is slid into the remaining intermediate space, preventing the crosslink 42 from shifting. In this way an absolutely form-fitting connection with the sidebar 1 is also created for the I-shaped crosslink 42. The cross-shaped key 47 engages on the one hand in an undercut 34 of the notch 9 and on the other hand in the intermediate space between the flanges 43, 44 and the web 45. In this way, similar to that for the T-shaped crosslink 37, a return motion as well as tilting or rotation of the crosslink 43 is prevented.

The intermediate space between the flanges 43, 44 can be designed as a dovetail or T-shaped guide 48 in order to retain the key 47 of appropriate shape.

It can also be seen in FIGS. 8 and 9 that at least two T-shaped or I-shaped crosslinks can be located along an edge of a sidebar 1.

FIG. 10 illustrates a version of a locking element in the form of a rotating eccentric cam 49 located in sidebar 1 and adjacent to the notches 9. This rotating eccentric cam 49 is characterized by a flat 50 on one side and is fitted with an outwardly facing slot 51 to accept the tip of a screwdriver. To permit the mounting of a crosslink 16 the flat 50 is aligned flush with one side of the notch 9 so that the crosslink can be inserted and then shifted toward the undercuts 12, 13. This shift can be effected either by hand or by rotating the eccentric cam 49. By rotating the eccentric cam 49 through about 180° the setting shown in the lower section of FIG. 10 is reached in which there is a positive fit between the sidebar 1 and the crosslink 16 in every direction. The eccentric cam 49 is secured to keep it from falling out of its corresponding mounting hole in the sidebar 1 in a known manner not depicted.

FIGS. 11-14 illustrate a modified version of the side bar 1 and key 24 depicted in FIGS. 1-3. The crosslink 16 shown in FIGS. 11-14 is identical to that shown in FIGS. 1-3. In FIGS. 11-14, elements corresponding to elements of the side bar 1 and key 24 shown in FIGS. 1-3 are identified with the same reference numbers primed.

The only difference between the side bar 1' shown in FIGS. 11 and 12 and that shown in FIGS. 1 and 2 is that the side bar 1' in FIGS. 11 and 12 has a V-shaped surface 60 which bears against a similarly shaped surface 62 of the elastically resilient end 25' of key 24'. Surface 62 is biased against surface 60 to maintain the key 24' in position with the cross link 16 locked to the side bar 1' in the manner described with reference to FIGS. 1-3.

In addition, the key 24' has a pair of lugs 64 and 66. In the position of the key 24' shown in FIG. 11, lug 64 presses against dovetail guide 27 to help bias surface 62 against surface 60. In that position, lug 66 is biased into groove 28. It can therefore be seen that if crosslink 16 were removed from side bar 1, by retracting key 24' from engagement with the surface 60 and removing cross-link 16 from engagement with the undercuts 12', 13' and the bars 14', 15', lugs 66 would engage groove 28 to prevent key 24' from slipping off the end of crosslink 16.

A projection 68 is provided near the end of resilient portion 25' of key 24' for engaging key 24' with a screw driver so as to push the key 24' out of engagement with the surface 60. FIGS. 13 and 14 illustrate the crosslink 16 and key 24' alone, with the key 24' pushed out of engagement with the groove 28, and both lugs 64 and 66 biased against the guide 27.

The crosslinks 16, 37, 42 can be fabricated without difficulty from extruded metal or plastic profiles. They are cut to the required length so that the innovative cable carrier can be made up in any desired widths. To allow for lateral shifting it is then necessary only to cut the grooves 28, 40, 46 at the ends of the crosslinks 16, 37, 42 by means of a simple machining procedure. A slot 31 can also be machined in a simple fashion such as by punching. These finishing procedures can be conducted at the same time as the cutting to length.

With this invention a form-fitting, torsion-resistant connection is created between the sidebars and the crosslinks which can easily be assembled and separated without any need for special tools.

We claim:

1. A cable carrier chain to support flexible energy carrier lines, comprising:

two parallel side chains of sidebars, each said side chain including a series of sidebars joined one with another in a pivotable connection, each said side chain longitudinal direction and being spaced apart from the other said side chain in a lateral direction;

at least two parallel laterally extending crosslinks having ends which join respectively two parallel sidebars, said crosslinks and said sidebars bounding a space on two opposed sides with said sidebars and on two opposed sides with said crosslinks;

notches at opposite side edges of the sidebars to receive corresponding ends of the crosslinks, each said notch having an undercut at a distance from a corresponding edge of the sidebar, said undercut being sized and positioned to engage a corresponding end of a cross-link;

protrusions in the area of the notches, each said protrusion extending in the longitudinal direction;

said ends of said crosslinks each having an aperture to receive a corresponding protrusion in a longitudinal sliding fit so that said crosslink is slideable on said sidebar in the longitudinal direction to an engaged position in which said end engages under a corresponding undercut; and releasable locks between said ends and corresponding sidebars for resisting retrograde sliding in the longitudinal direction of said ends relative to said sidebars out of said engaged positions.

2. A cable carrier chain as claimed in claim 1, wherein the releasable locks comprise keys which are slideable into said notches and are of a width corresponding to a free space in said notches between said sidebar and said crosslink.

3. A cable carrier chain as claimed in claim 2, wherein the keys are slideably retained in guides in the crosslinks.

4. A cable carrier chain as claimed in claim 1, wherein the releasable locks comprise rotating eccentric cams adjacent to the notches and held captive in the sidebars.

5. A cable carrier chain as claimed in claim 1, wherein the releasable locks comprise elastic detent tabs located in at least one of the notches and facing in the longitudinal direction of the sidebar.

6. A cable carrier chain as claimed in claim 1, wherein the crosslinks are made from laterally continuous profiles, cut to length, and wherein the apertures are formed in said crosslinks by removing material from said profiles.

7. A cable carrier chain as claimed in claim 1, wherein the crosslink ends each have at least one web and at least one flange perpendicular to said web and each notch has an undercut of a depth corresponding to the location of said flange to receive said flange.

8. A cable carrier chain as claimed in claim 7, wherein the notches in the sidebars are at least as wide in the longitudinal direction as a longitudinal width of said web and of a perpendicular flange at one side of said web.

9. A cable carrier chain as claimed in claim 7, wherein an undercut is located at two lateral sides of each said notch on opposite sides of a corresponding protrusion at a depth corresponding to said perpendicular flange.

10. A cable carrier chain as claimed in claim 7, wherein the web and the flange form an L shape in cross section.

11. A cable carrier chain as claimed in claim 7, wherein the web and the flange form a T shape in cross section.

12. A cable carrier chain as claimed in claim 7, wherein said web and said flange with a further flange together form an I shape in cross section.

13. A cable carrier chain as claimed in claim 12, wherein the notches in the sidebars are generally as wide in the longitudinal direction as the longitudinal width of the flanges, and wherein located at the bottom of the notches are undercuts of dimensions corresponding to those of the flanges and that located on the opposite side of the notches are undercuts corresponding to the height of the webs.

14. A cable carrier chain as claimed in claim 7, wherein, said ends of said crosslinks have a C-shaped cross section with a perpendicular flange extending from each of two web, said flanges extending in the same direction from said webs, and wherein each said web extends into a corresponding notch and each said flange is engaged by a corresponding undercut in the corresponding notch.

15. A cable carrier chain as claimed in claim 7, wherein said protrusion is formed on the sidebar on an upper face of a land between two notches and a complementary aperture is formed in the corresponding end of a crosslink which engages said protrusion to act as a stop to prevent lateral movement of said crosslink relative to said sidebar.

16. A cable carrier chain for supporting flexible energy carrier lines, comprising:
a pair of sidebars, said sidebars extending in a longitudinal direction and being parallel to and spaced apart from one another in a lateral direction, said sidebars having means at their ends for pivotably connecting said sidebars to another pair of sidebars in serial fashion to make said chain;
a crosslink extending in said lateral direction and spanning said sidebars on one side thereof, said crosslink being engaged with each said sidebar at said side so as to hold said sidebars laterally spaced apart and parallel to one another; and
a key corresponding to each said sidebar for locking said crosslink to each said sidebar;
wherein:
each said sidebar has a notch at said side to receive said crosslink with at least one longitudinally extending undercut in said notch, and each said side bar has a straddle means presenting opposed laterally facing surfaces;
said crosslink has a longitudinally extending flange for being received in each undercut and a slot means for receiving each said straddle means, each said slot means presenting opposed laterally facing surfaces for confronting the laterally facing surfaces of the corresponding straddle means;
said notch is sized so as to permit positioning in a first direction said crosslink in said notch to align said flange with said undercut and thereafter to permit shifting said crosslink longitudinally relative to said sidebar to an engaged position in which said flange is received in said undercut, said straddle means is received in said slot means, and a longitudinal space exists between said crosslink and said sidebar;
said key is positioned in said longitudinal space between said crosslink and said sidebar so as to prevent retrograde movement of said crosslink out of said engaged position;
said straddle means includes a bar centrally positioned within a corresponding notch;
undercuts are provided on each lateral side of said bar, and a flange is received in each said undercut; and
two said notches are provided, said notches are longitudinally spaced apart, and the crosslink has a C-shaped cross-section at its lateral position where it engages in said notches, and flanges extending longitudinally in the same direction from the ends of the C-shape of the cross-section, said flanges engaging in the undercuts of the two said notches.

17. A cable carrier chain for supporting flexible energy carrier lines, comprising:
a pair of sidebars, said sidebars extending in a longitudinal direction and being parallel to and spaced apart from one another in a lateral direction, said sidebars having means at their ends for pivotably connecting said sidebars to another pair of sidebars in serial fashion to make said chain;
a crosslink extending in said lateral direction and spanning said sidebars on one side thereof, said crosslink being engaged with each said sidebar at said side so as to hold said sidebars laterally spaced apart and parallel to one another; and
a key corresponding to each said sidebar for locking said crosslink to each said sidebar;
wherein;
each said sidebar has a notch at said side to receive said crosslink with at least one longitudinally extending undercut in said notch, and each said side bar has a straddle means presenting opposed laterally facing surfaces;
said crosslink has a longitudinally extending flange for being received in each undercut and a slot means for receiving each said straddle means, each said slot means presenting opposed laterally facing surfaces for confronting the laterally facing surfaces of the corresponding straddle means;
said notch is sized to as to permit positioning in a first direction said crosslink in said notch to align said flange with said undercut and thereafter to permit shifting said crosslink longitudinally relative to said sidebar to an engaged position in which said flange is received in said undercut, said straddle means is received in said slot means, and a longitudinal space exists between said crosslink and said sidebar;
said key is positioned in said longitudinal space between said crosslink and said sidebar so as to prevent retrograde movement of said crosslink out of said engaged position; and
each said key is slideably retained in a guide of said crosslink.

18. A cable carrier chain as claimed in claim 17, wherein each said key has a longitudinally facing V-shaped surface biased against a similarly shaped surface of the corresponding sidebar to hold said key in lateral position within said longitudinal space.

19. A cable carrier chain as claimed in claim 17, wherein each said key has a lug engageable in said slot means to prevent said key from sliding out of an end of said guide.

* * * * *